(12) United States Patent
Vincenti

(10) Patent No.: US 6,298,555 B1
(45) Date of Patent: *Oct. 9, 2001

(54) METHOD OF MAKING A DUCT UTILIZING A GRIP FLANGE

(75) Inventor: Joe Paul Vincenti, Croydon (GB)

(73) Assignee: Al International SRL, Imercate (Milano) (IT)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/375,986

(22) Filed: Aug. 16, 1999

Related U.S. Application Data

(63) Continuation-in-part of application No. 08/691,881, filed on Aug. 1, 1996, now abandoned.

(30) Foreign Application Priority Data

Sep. 20, 1995 (GB) .................................................. 9519190

(51) Int. Cl.[7] .................................................. B21D 51/16
(52) U.S. Cl. .................................... 29/890.14; 29/525.01; 138/DIG. 4
(58) Field of Search ........................ 29/890.14, 890.148, 29/890.149, 428, 525.01; 52/716.8, 800.17, 800.12, 800.11, 204.71, 217, 800.15, 716.3; 108/27; 312/140.1, 140.2, 140.3, 140.4; 285/424; 138/155, DIG. 4

(56) References Cited

U.S. PATENT DOCUMENTS 3,303,626 * 2/1967 Brigham ............................ 52/800.17
3,918,231 * 11/1975 Kessler .............................. 52/800.15
3,988,030 * 10/1976 Twedell ................................ 285/424
4,351,137 * 9/1982 Enyart et al. ..................... 52/800.15
4,539,243 * 9/1985 Miller ................................ 52/800.15
4,782,630 * 11/1988 Kleyn ..................................... 52/217
4,787,184 * 11/1988 Boidron ................................. 52/217
4,940,264 * 7/1990 Mez ...................................... 285/424
4,995,648 * 2/1991 Jackson ................................ 285/424
5,022,688 * 6/1991 Arnoldt ................................ 285/424
5,054,823 * 10/1991 Arnoldt ................................ 285/424
5,345,722 * 9/1994 Mckann ................................ 52/217
5,450,879 * 9/1995 Toben .................................. 285/424
5,528,869 * 6/1996 Boomer et al. ....................... 52/217
5,644,878 * 7/1997 Wehrmann ......................... 52/716.8

* cited by examiner

Primary Examiner—I Aida-Rosenbaum
Assistant Examiner—T. Nguyen
(74) Attorney, Agent, or Firm—Koda & Androlia

(57) ABSTRACT

A method for making a polygonal duct from a flat, rectangular panel including the steps of providing longitudinally extending cuts in the panel, folding the panel into the desired polygonal shape, assembling a grip flange to the opposing edge portions of the panel and coupling the grip flanges together. The grip flange is a two-piece grip flange including snap-together male and female sections with cross-sectional shapes similar to an L and an F, respectively, which when snapped together form a panel insertion channel to both frictionally engage the surface of the edge portion of the panel and clamp the edge portion through forcible deformation of the edge portion to form a permanent and secure attachment to the panel without the use of any hardware, adhesive or welding.

8 Claims, 4 Drawing Sheets

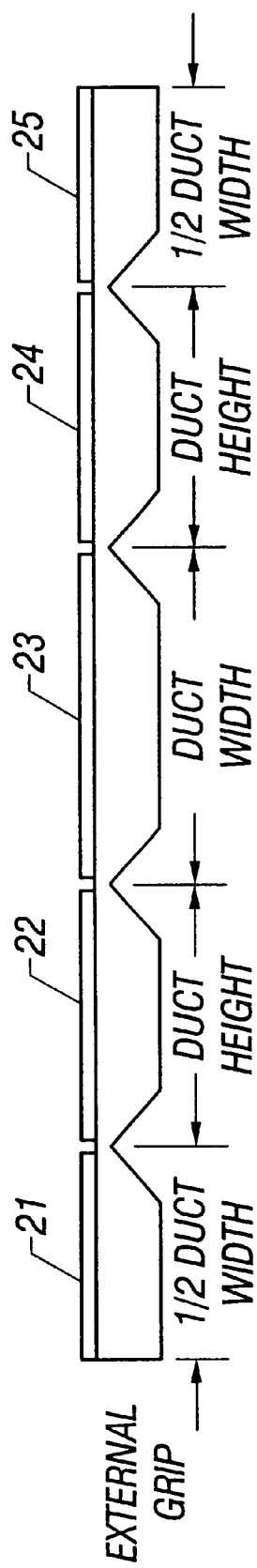
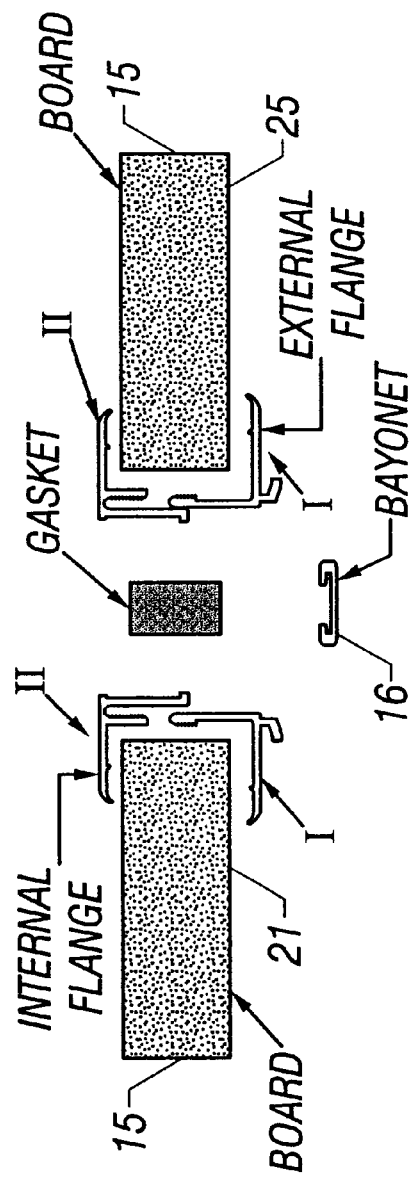

METHOD OF MAKING A DUCT UTILIZING A GRIP FLANGE

This a Continuation-In-Part Application of application Ser. No. 08/691,881, filed Aug. 1, 1996 now abandoned.

BACKGROUND OF THE INVENTION

1. Field of the Invention

The present invention relates to a method of making a duct from a flat board utilizing a grip flange. In particular, the board from which the duct is made is a rigid or a semi-rigid material capable of undergoing at least a small amount of compressive deformation and the grip flange is mounted to the board for assembly of the duct without the utilization of adhesives or welding.

2. Prior Art

A board having these qualities has recently been produced for use in forming thermally insulating ducts such as are employed for heating, ventilation and air conditioning. It consists of a rigid foamed plastics material, for example, a closed cell expanded phenolic foam, although other open or closed cell expanded foam materials such as polyurethanes could be used. As produced, the expanded plastics material is in the form of a planar board having a metallic foil, for example of aluminum, bonded to each major surface. Ducting, typically of rectangular cross section, may be produced therefrom.

As opposed to conventional ducts formed of metal sheet, the product is light, with good thermal insulating properties, and often sufficiently rigid per se for the intended use (although further strengthening measures can be taken in this respect if necessary, for example when requiring long unsupported spans, large cross-sectional areas, or significant differential pressures between interior and exterior). However, a problem arises as to how to firmly and efficiently couple together edge portions of the planar board to form ducting of a polygonal cross-section and how to couple a length of duct so formed either to a further length thereof, or to ancillary equipment such as a fan.

SUMMARY OF THE INVENTION

The present invention is a unique method of making a duct of polygonal cross-section from a planar board including the steps of cutting the board so that it may be bent into a duct of the required polygonal cross-section, mounting a grip flange to the opposing edge portions of the board, each of said grip flanges comprising a two-piece grip flange comprising interlocking snap-together male and female sections with cross-sectional shapes similar to an L and an F, respectively, which when snapped together form a panel insertion channel to both frictional engage an edge portion of said board and clamp said edge portion through forcible deformation of the edge portion whereby a permanent and secure attachment to the edge portion of the board is provided without the use of any hardware, adhesive or welding, and coupling together the grip flanges provided on the opposing edge portions of the board.

In particular, the grip flange for assembly to the edge portion of the board comprises first and second elongate portions, said first portion comprising a first elongate web, and a sole elongate second web extending from one side of the first web to provide a member of L-shaped cross-section, and said second portion comprising third and fourth elongate webs providing an L-shaped cross-section, and a fifth web extending from the third web in spaced relation to, and generally parallel to, the fourth web to form with the fourth web an insertion channel for reception of at least a free elongate edge portion of the second web, the insertion channel and the said free portion being adapted for frictional engagement.

Preferably the fifth web is adapted for providing the frictional engagement with the free portion. The frictional engagement may be provided by raised portions on the interior surface of the channel and/or on the free portion, and preferably on the surfaces of both parts where one overlies the other when the two portions are assembled about the board edge. In a preferred embodiment the frictional engagement is provided by elongate ribbing on at least one surface of the free portion and the corresponding internal surface(s) of the insertion channel, and preferably this ribbing is formed on the fifth web.

Preferably the second web has a width substantially equal to, or slightly less than, the thickness of the board for which the grip flange system is intended, and the fourth web has a width which is at least substantially equal to the board thickness. Advantageously both these conditions apply, so that the two webs substantially co-extend across the bottom of the U-shaped channel formed by the assembled first and second flange portions.

Preferably either or (advantageously) both the first and third web are adapted for frictional engagement and/or deformation of the board, such as by being provided with raised portions. In a preferred embodiment, these raised portions are in the form of at least one longitudinal rib internally of the L-shaped cross-section, but other means, for example the provisions of inwardly projecting tangs which deform or pierce the metal foil, are possible.

BRIEF DESCRIPTION OF THE DRAWINGS

For a better understanding of the invention, and to show how the same may be carried into effect, reference will now be made, by way of example, to the accompanying drawings, in which:

FIG. 3 illustrates the manner of cutting necessary on the first flange portion for use on ducting;

FIG. 3A illustrates the manner of cutting necessary on the board for use as ducting before folding;

FIG. 4 is an enlarged portion of FIG. 3D and illustrates a grip flange system in cross-section, as applied to a board edge;

FIG. 6 is an enlargement of the female part of FIG. 2(e); and

DETAILED DESCRIPTION OF THE INVENTION

The method of making a duct of the present invention includes a grip flange which comprises a first flange portion I and a second flange portion II.

Figure 1:
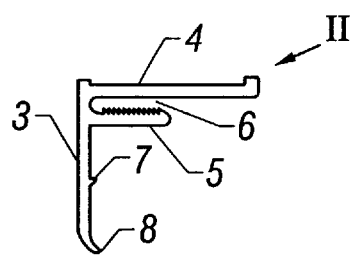
FIGS. 1 and 6 illustrate a second flange portion in cross-section.

As shown in FIG. 1, a second flange portion II comprises a third elongate web 3 from which fourth and fifth parallel spaced webs 4, 5 which define an insertion channel 6, the web 4 being at or adjacent an edge of web 3. The internal surface of channel 6 defined by web 5 is provided with longitudinal ribs, for example on a thickened edge portion of web 5. Web 4 has a width generally equal to the thickness of board with which it is intended to be used, and while web 5 is shown as having a substantially lesser width, this need not be the case.

Figure 2:
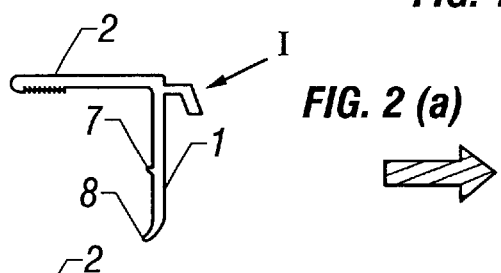
FIGS. 2(a)–2(d) illustrate in cross-section four different first flange portions to which the second flange portion may be assembled.
FIGS. 2(e)–2(h) show the resulting assemblies.
Figure 2:
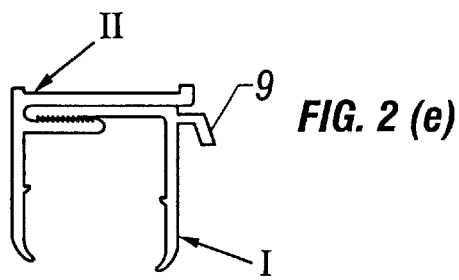
Figure 2:
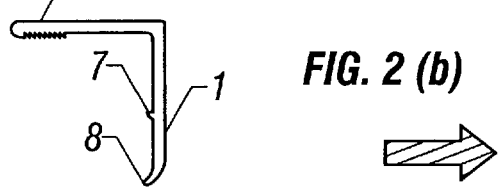
Figure 2:
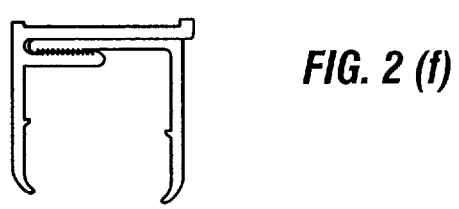
Figure 2:
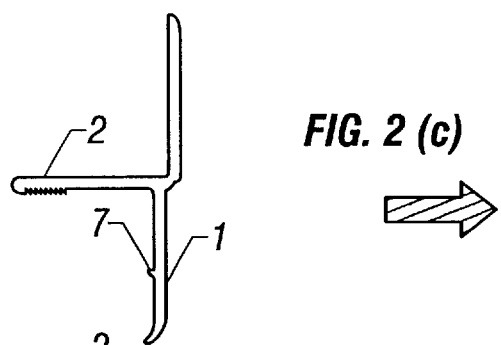
Figure 2:
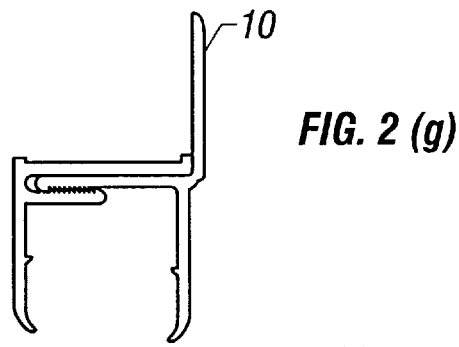
Figure 2:
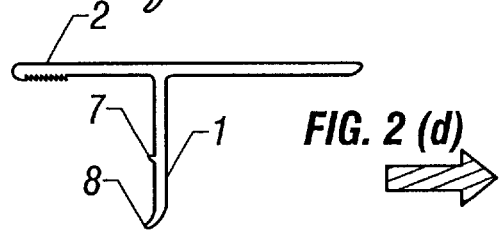
Figure 2:
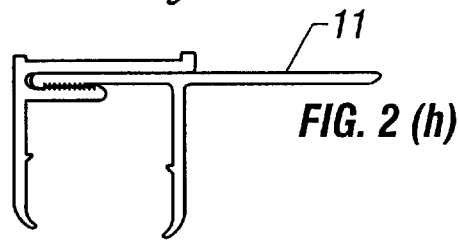
Figure 5:
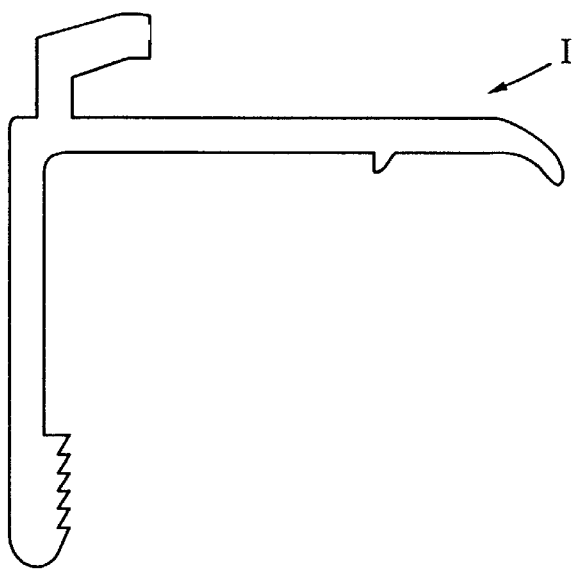
FIG. 5 is an enlargement of male part of FIG. 2(a)
Figure 6:
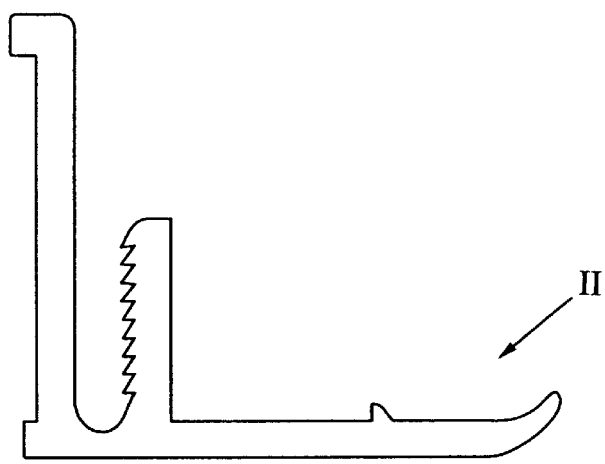

This second flange portion II can be used with a variety of first flange portions I, four of which are shown in FIGS. 2(*a*)–2(*d*), and each of which comprises a first elongate web 1 from which one side of which extends a sole second web 2 so as to provide an L-shape cross-section. The free edge of web 2 is enlarged, and comprises longitudinal ribs on the side which cooperates with the web 5, thus providing frictional engagement. As shown in FIG. 5 (corresponding to FIG. 2(*a*)) and FIG. 6, the cooperating ribs may be of complementary saw-tooth form, thus providing a ratchet effect upon assembly.

Each of webs 1 and 3 is provided with internally facing ribs. As shown, there is a rib 7 on the face of the web, and another rib 8 is formed at the edge of the web.

In use (as shown in FIG. 4), the first and second flange portions I and II are placed on either side of a board 15 edge of portions 21 and 25 and squeezed together in a direction transverse to the board 15 thickness so that the web 2 enters insertion channel 6 and is held there by friction and/or engagement of the associated ribs. At the same time, the ribs 7, 8 frictionally engage and/or deform the major surfaces of the board 15 to secure the assembly thereon without the use of adhesives or welding.

Figure 3B:
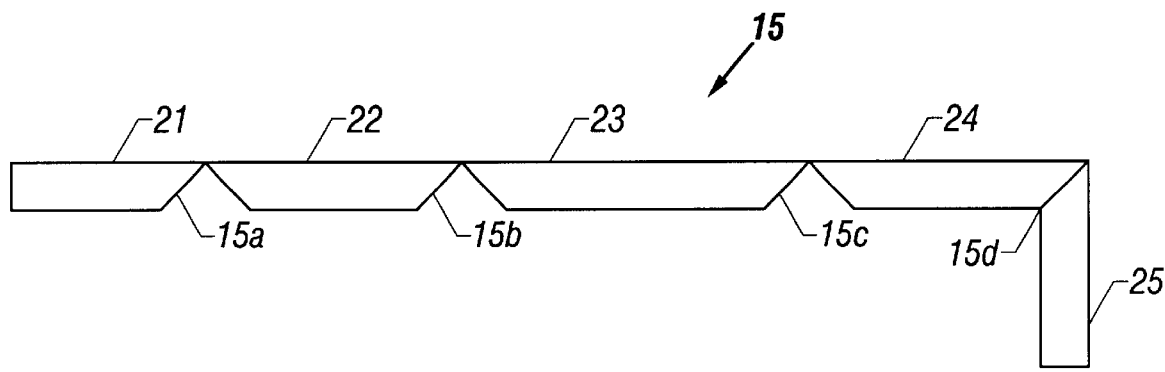
FIG. 3B illustrates the first fold of the board used in the present invention.
Figure 3C:
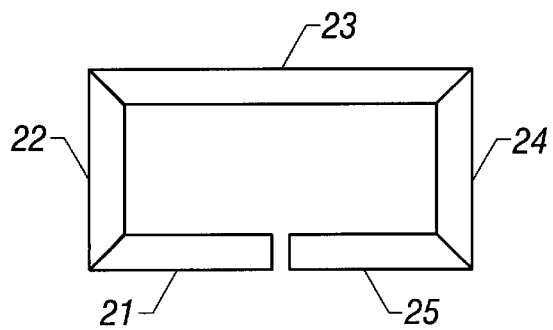
FIG. 3C illustrates a completely folded board to make a duct.
Figure 3D:
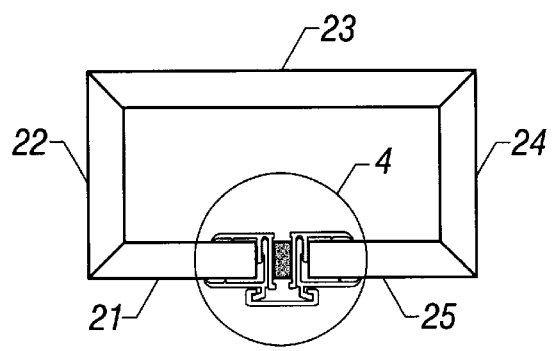
FIG. 3D illustrates a completely folded board with the grip flanges of the present invention installed.
Figure 7:
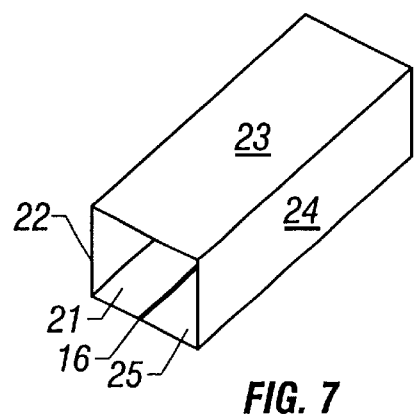
FIG. 7 is a perspective view of FIG. 3D.

When applying the grip flange system to the end of the board 15 to form a duct, the second flange portion II will form the interior member. For a rectangular cross-section duct, four Vee cuts 15*a*, 15*b*, 15*c* and 15*d* will be cut to line the internal edge area of board 15 forming portions 21, 22, 23, 24 and 25, allowing for metal thicknesses. In a preferred method of use, the board 15 will be in one piece and Vee cuts 15*a* to 15*d* are made as illustrated in FIG. 3A to permit portions 21 to 25 of board 15 to be bent. FIG. 3B illustrates the bending of portion 25 of board 15 and the other portions 21 to 24 are similarly bent about the outside to form the duct as shown in FIGS. 3C and 7. The second flange portions II are then assembled to the first portion I as shown in FIGS. 3D and 4.

The first flange portion I may be plain, as illustrated in FIG. 2(*b*), for example for completing a duct end. However, it may be provided with other portions, enabling assembly to other ducts or apparatus. FIG. 2(*a*) illustrates a further channel piece 9 extending from the web 1. When two ducts so provided are abutted, channels may be slid over adjacent channel pieces 16 to couple the ducts together (this is known as a bayonet fitting 16 as shown in FIG. 4). FIG. 2(*c*) shows a web 10 which is generally coplanar with web 1 but extends on the other side of the web 2. FIG. 2(*d*) shows a web 11 which is coplanar with the sole web 2 but extending on the other side of web 1.

FIG. 2(*c*) and 2(*d*) illustrate the form and application of other types of two-part grip flange system. This differs from that shown in FIGS. 1, 2(*a*) and 2(*b*) in that in 2(*c*) the second flange portion comprises a further web extending parallel to web 2; and in that in 2(*d*) neither of webs 2 and 4 is substantially coextensive with the edge of the board. It was found that, in practice, the second flange portion has no mechanical function. Furthermore, its provision makes it difficult to increase the width of the web 4 of the first potion. In addition, and perhaps more importantly, when there is only a single web in which it is necessary to form Vee cuts (as when applied to a duct end), these cuts can be made by stamping, This is a relatively cheap and rapid process which is applicable to the embodiments of FIGS. 1 and 2, but cannot be applied when more than one web needs to be cut at the same time.

The increased overlap with the board edge provided by widening the flange 2 or 4, and the increased overlap with each other when both are widened, increases the strength of the assembled duct and flange, and, by providing greater resistance to opening of the sides of the U of the assembled flange portions, reduces the chance of disengagement of the assembled flange with the board.

It should be apparent to those skilled in the art that the above described embodiments are illustrative of but a few of the possible embodiments that could be made and numerous other embodiments could be made without departing from the spirit and scope of the invention.

I claim:

1. A method of making a duct of polygonal cross-section from a planar board consisting of the steps of:

providing longitudinally extending cuts in said board;

folding said board into a duct of a polygonal cross-section with two edge portions of the folded board opposing each other;

providing a first grip flange and a second grip flange both comprising snap-together male and female sections with cross-sectional shapes similar to an L and an F, respectively, wherein the L-shaped male section has a channel piece, a rib number and a teeth-like web member and the F-shaped female section has a rib number and multiple longitudinal teeth on an inter-based of an insertion channel;

securing the first and second grip flanges to the ends of the two opposing edge portions of the folded board and forcibly deforming each of the edge portions by inserting the web members of the L-shaped male section into the insertion channels of the F-shaped female section and thereby forming a secure attachment to each of the edge portions without the use of any hardware, adhesive or welding; and coupling the first and second grip flanges on the two opposing edge portions of the folded board together.

2. The method according to claim 1, wherein said longitudinal cuts are VEE cuts.

3. The method according to claim 1, wherein a thickness of the insertion channel in the F-shaped female section is substantially the same as a thickness of the L-shaped male insertion member.

4. The method according to claim 3, wherein a length of the insertion member of the L-shaped male section and a length of a top web of the F-shaped female section are both substantially equal to or less than the thickness of the board.

5. The method according to claim 4, wherein the webs of the male and female sections which are positioned along a face of the board are adapted for frictional engagement with and lateral clamping of the board.

6. The method according to claim 5, wherein the webs of each of the male and female sections which form said panel insertion channel incorporate at least one longitudinal rib for frictional engagement and ends of said webs are curved inwards towards the face causing substantial deformation the board when the grip flange is installed on said board.

7. The method according to claim 6, wherein the male and female sections are made out of metal.

8. The method according to claim 7, wherein the grip flanges are coupled together by providing a channel piece extending from each of said opposing grip flanges and sliding a bayonet fitting over both of the channel pieces.

\* \* \* \* \*

UNITED STATES PATENT AND TRADEMARK OFFICE
CERTIFICATE OF CORRECTION

PATENT NO. : 6,298,555 B1
DATED : October 9, 2001
INVENTOR(S) : Joe Paul Vincenti It is certified that error appears in the above-identified patent and that said Letters Patent is hereby corrected as shown below:

<u>Title page,</u>
Item [73], Assignee:
Change "Al International SRL, Imercate (Milano) (IT)" to -- Pal International SRL, Vimercate (Milano) (IT) --

Signed and Sealed this

Fourth Day of June, 2002

*Attest:*

*Attesting Officer*

JAMES E. ROGAN
*Director of the United States Patent and Trademark Office*